Figure 3:
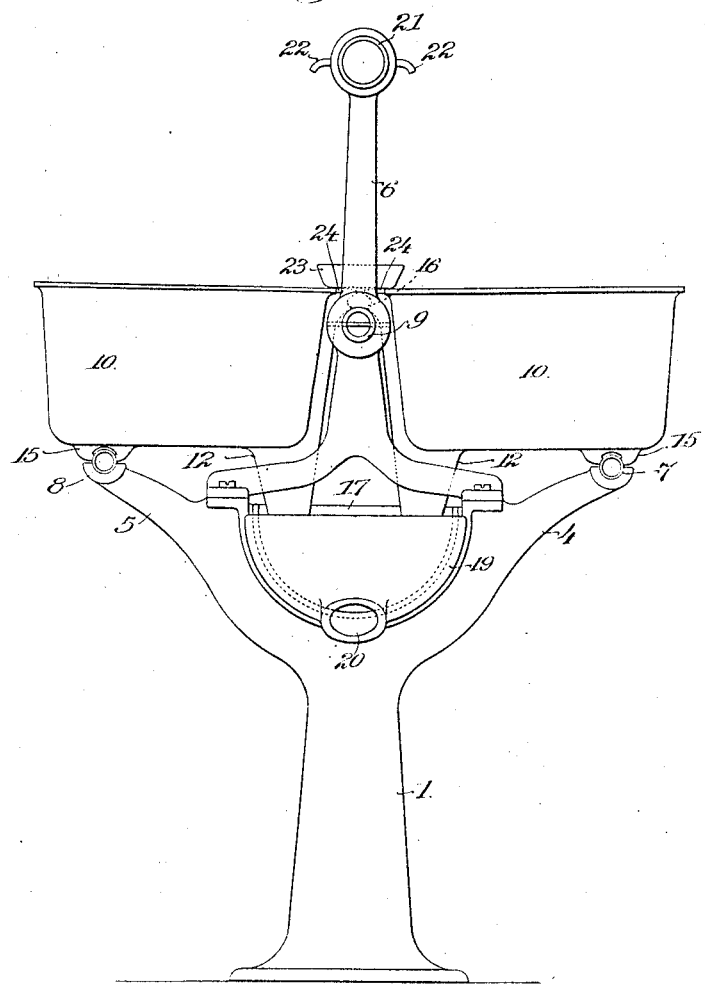

No. 892,523. PATENTED JULY 7, 1908.
E. P. HOWE.
WASHSTAND.
APPLICATION FILED NOV. 2, 1903.
3 SHEETS—SHEET 1.
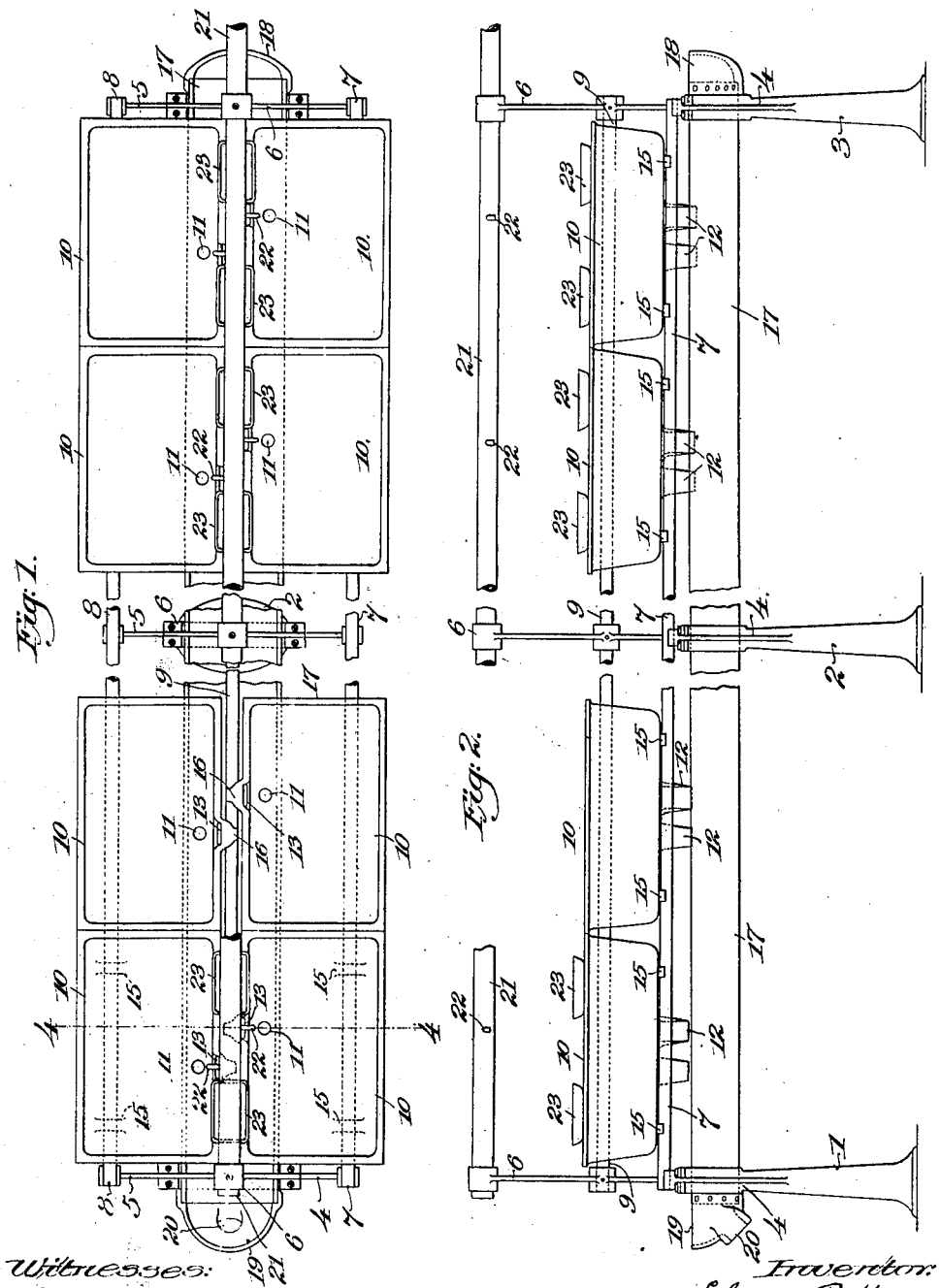

No. 892,523. PATENTED JULY 7, 1908.
E. P. HOWE.
WASHSTAND.
APPLICATION FILED NOV. 2, 1903.

3 SHEETS—SHEET 2.

Witnesses:
John F. C. Prinkler
Alfred H. Hildreth

Inventor:
Elmer P. Howe
by his Attorneys
Phillips Van Everen & Fish

No. 892,523. PATENTED JULY 7, 1908.
E. P. HOWE.
WASHSTAND.
APPLICATION FILED NOV. 2, 1903.
3 SHEETS—SHEET 3.
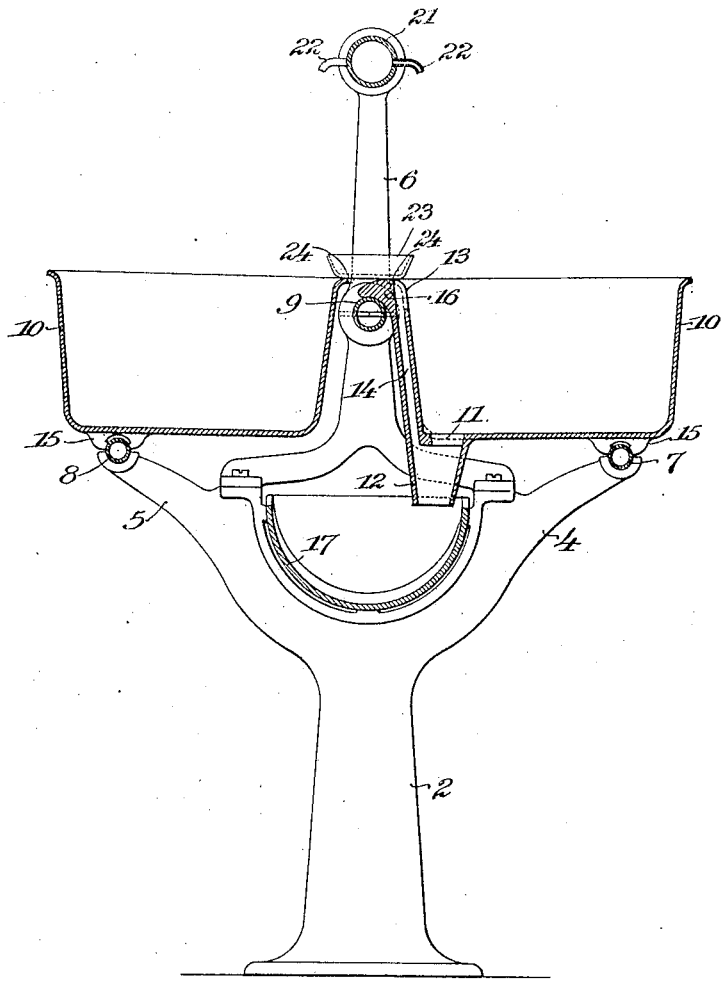

UNITED STATES PATENT OFFICE.

ELMER P. HOWE, OF BOSTON, MASSACHUSETTS.

WASHSTAND.

No. 892,523.      Specification of Letters Patent.      Patented July 7, 1908.

Application filed November 2, 1903. Serial No. 179,474.

*To all whom it may concern:*

Be it known that I, ELMER P. HOWE, a citizen of the United States, residing at Boston, in the county of Suffolk and State of Massachusetts, have invented certain new and useful Improvements in Washstands; and I do hereby declare the following to be a full, clear, and exact description of the invention, such as will enable others skilled in the art to which it appertains to make and use the same.

The present invention relates to wash stands which comprise a plurality of separate or individual wash basins or bowls and which are adapted for use in factories or other establishments in which a large number of persons are employed.

The objects of the present invention are to improve the construction and arrangement of the various parts of such stands with a view to providing a stand in which all expensive and insanitary fittings and connections are done away with and in which the various parts are of simple construction and so arranged that they can be readily kept in a perfectly sanitary condition.

The various features of my invention are embodied in a wash stand comprising a plurality of separate or individual basins each of which is provided with a discharge opening, and a conduit arranged to receive the water from the discharge openings of the basins.

In accordance with one feature of the invention the wash basins are supported and arranged so as to be readily movable from their normal position so as to give easy access to the conduit and the other parts of the stand beneath the basins for cleaning and disinfecting. Preferably the movability of the basins is secured by mounting them so that they can be readily removed bodily, the advantage of this construction being that not only is the conduit rendered easily accessible but the basins when removed can be placed in a cleaning or disinfecting fluid. This feature of the invention contemplates the use of any suitable form of conduit arranged to receive the water from the discharge openings of the basins. I prefer, however, to use a conduit consisting of an open gutter located beneath the discharge openings of the basins as such a conduit can be readily cleaned when the basins are removed and by its use no fittings or connections are required between the basins and the conduit.

In carrying out the features of my invention above referred to, I have provided a stand comprising vertical supports and horizontal rods connecting the supports upon which the basins rest and by which they are removably supported. The basins are arranged upon the rods in two rows and the open gutter is supported by the standards beneath the discharge openings of both rows of basins. Above and between the rows of basins a water pipe is supported by the vertical standards and is provided with lateral nozzles which discharge into the basins. This water pipe is provided with a valve which controls the flow of water in the pipe so that all of the basins can be filled simultaneously.

This wash stand in addition to the features of invention above referred to also embodies certain novel features of construction and arrangement of parts hereinafter described and claimed, the advantages of which will be obvious to those skilled in the art. These novel features are embodied in their preferred form in the wash stand illustrated in the accompanying drawings and hereinafter specifically described, but it is to be understood that except as defined in the claims they are not limited to the specific construction and arrangement illustrated but may be otherwise embodied without departing from the invention.

Referring to the drawings, Figure 1 is a plan view of a portion of a wash stand embodying the various features of my invention in their preferred form, the central portion of the stand being omitted and the two end portions being brought close together; Fig. 2 is a view in side elevation of the parts illustrated in Fig. 1; Fig. 3 is a view in end elevation of the stand illustrated in Figs. 1 and 2 looking from the left of these figures and Fig. 4 is a sectional view taken on the line 4—4 of Fig. 1.

1, 2 and 3 indicate vertical standards of which any desired number are provided. Each of these standards is provided at its upper end with laterally extending arms 4 and 5, and to these arms the base of a vertical bracket or standard 6 is bolted. The outer ends of the arms 4 are connected by a horizontal side rod 7 and the outer ends of the arms 5 are connected by a horizontal side rod 8. A central horizontal rod 9 connects the standards 6, this rod being located at a higher level than the side rods 7 and 8.

The basins 10 rest upon the rods 7, 8 and 9 and are removably supported thereby, the basins being arranged in two rows and each basin resting upon a rod 7 or 8 and upon the rod 9. Each basin as viewed from above is rectangular in shape so that the basins can be arranged compactly upon the rods side by side. The walls of the basins slope inwardly and are curved to meet the bottom and are also curved where they meet each other so that the inner surfaces of the basins present no sharp corners or angles in which dirt can collect. A discharge opening 11 is formed in the bottom of each basin near its inner wall and opens into a discharge spout or nozzle 12. Each basin is also provided with an overflow opening 13 formed in the upper edge of its inner wall and this opening opens into an overflow passage 14 leading to the spout or nozzle 12. This passage way is straight and can be easily cleaned as can also the spout or nozzle 12 as will be apparent from an inspection of Fig. 4. Each basin 10 together with the walls of the passage 14 and spout 12 consists of a single integral casting. Upon the bottom of each basin near its outer edge are formed retaining lugs 15 which rest upon one of the side rods 7 and 8, and upon the inner wall of each basin at its upper edge is formed a projection 16 which extends over and rests upon the central rod 9. The lugs 15 form seats which prevent the basins from being accidentally displaced but allow the basins to be readily removed when desired. The side rods 7 and 8 are so placed with relation to the central rod 9 that the bottoms of the basins slope towards the discharge openings so that all of the water runs out of the basins whenever the plugs which close the discharge openings are removed.

Beneath the spouts 12 an open gutter 17 is located into which the water from the basins is discharged. This gutter is supported by the vertical standards 1, 2 and 3 and slopes from the right towards the left as viewed in Fig. 2. The right hand end of the gutter is closed by a casting 18 and the left hand end is closed by a casting 19 which is provided with a discharge opening 20 through which the water passes from the gutter.

A water pipe 21 is supported in the upper ends of the standard 6 above and between the two rows of basins and is provided with lateral nozzles 22 arranged to discharge into the basins. The flow of water in this pipe is controlled by a suitable valve, not shown, so that all of the basins can be filled simultaneously.

If desired individual removable soap dishes may be provided. These soap dishes are indicated at 23 and rest upon the adjacent edges of the two rows of basins, being held from accidental displacement by lugs 24 projecting downwardly from the bottoms of the dishes.

It will be seen that all of the parts of the wash stand above described are of simple construction and are so arranged that they are not liable to become clogged up and foul. The basins can be readily removed as often as desired and thoroughly cleaned and disinfected. When the basins are removed the gutter is accessible and can be cleaned and disinfected whenever necessary. The wash stand has all the advantages of a wash stand comprising a plurality of individual set basins or bowls without requiring the expensive fittings and connections commonly used in such stands and can be easily kept in a perfectly sanitary condition.

Having thus indicated the nature and scope of my invention and having specifically described a wash stand embodying the same in its preferred form, I claim as new and desire to secure by Letters Patent of the United States.

1. A wash stand comprising a plurality of separate basins, each of which is provided with a discharge opening, a conduit arranged to receive water from the discharge openings of the said basins, and means for supporting the basins arranged to permit each basin to be readily moved from its normal position to give easy access to the conduit beneath the basins, substantially as described.

2. A wash stand comprising a plurality of separate removable basins, each of which is provided with a discharge opening, an open gutter arranged to receive the water from the discharge openings of said basins, and means for supporting the basins arranged to permit each basin to be readily moved from its normal position to give easy access to the gutter beneath the basins, substantially as described.

3. A wash stand comprising a plurality of separate removable basins arranged in two rows, each of said basins being provided with a discharge opening, an open gutter located between the two rows of basins, and beneath the discharge openings of the basins, and means for supporting the basins arranged to permit ready access to the gutter when the basins are removed, substantially as described.

4. A wash stand comprising a plurality of separate basins, each of which is provided with a discharge spout and an overflow passage way integral with the basin so as to be removed therewith, a conduit arranged to receive the water from the discharge spouts and overflow passageways of the basins, and means for supporting the basins arranged to permit each basin to be readily moved from normal position to give easy access to the conduit beneath the basins, substantially as described.

5. A wash stand comprising a plurality of separate basins, each of which is provided with a single spout integral with the basin so as to be moved therewith, and with overflow and discharge openings through which the water passes to said spout, a conduit arranged to receive the water from said spouts, and means for supporting the basins arranged to permit each basin to be readily moved from normal position to give easy access to the conduit beneath the basins, substantially as described.

6. A wash stand comprising a plurality of separate removable basins arranged in two rows, a conduit located beneath the basins, a common support for the inner ends of the basins and separate supports for the outer ends of the basins, substantially as described.

7. A wash stand comprising vertical standards, horizontal rods connecting said standards, a plurality of basins, each of which is provided with a discharge opening, resting on said rods and removably supported thereby, and an open gutter supported on said standards and arranged beneath the discharge openings of said basins, substantially as described.

8. A wash stand comprising vertical standards, horizontal rods connecting said standards, a plurality of basins arranged in two rows resting on said rods and removably supported thereby, each basin being provided with a discharge opening, an open gutter supported by said standards and arranged beneath the discharge openings of said basins, and a water pipe supported by said standards above and between the two rows of basins provided with lateral nozzles discharging into said basins, substantially as described.

9. A wash stand comprising a plurality of separate basins, rectangular in shape as viewed from above, and each provided with a discharge opening, a conduit arranged to receive water from the discharge openings of said basins, and means for supporting said basins arranged to permit each basin to be moved from normal position to give easy access to the conduit beneath the basins, substantially as described.

10. A wash stand comprising a plurality of separate removable basins arranged in two rows, each of said basins being rectangular in shape as viewed from above, and being provided with a discharge opening near its inner wall, an open gutter located between the two rows of basins and beneath the discharge openings of the basins, and a support for said basins arranged to permit ready access to the gutter when the basins are removed, substantially as described.

11. A wash stand comprising a plurality of separate removable basins, each of said basins being rectangular in shape as viewed from above, and being provided with a discharge opening near one end thereof, an open gutter arranged to receive the water from the discharge openings in said basins, and a support for said basins arranged to support said basins with their bottoms sloping towards the discharge openings, substantially as described.

12. A wash stand comprising a plurality of separate basins each of which is provided with a discharge opening, an open gutter located beneath the basins and arranged to receive the water from the discharge openings of the basins and a support for the basins constructed to permit each basin to be removed bodily from the support to give easy access to the gutter beneath the basins, substantially as described.

In testimony whereof I affix my signature, in presence of two witnesses.

ELMER P. HOWE.

Witnesses:
FRED O. FISH,
ALFRED H. HILDRETH.